(12) United States Patent
Jacob et al.

(10) Patent No.: US 11,887,029 B2
(45) Date of Patent: Jan. 30, 2024

(54) ARTIFICIAL INTELLIGENCE SYSTEMS AND METHODS CONFIGURED TO PREDICT TEAM MANAGEMENT DECISIONS

(71) Applicant: STATE FARM MUTUAL AUTOMOBILE INSURANCE COMPANY, Bloomington, IL (US)

(72) Inventors: Michael Shawn Jacob, Le Roy, IL (US); Manali Desai, Bloomington, IL (US); Leah Garcia, Hudson, IL (US); Oscar Allan Arulfo, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 18/172,069

(22) Filed: Feb. 21, 2023

(65) Prior Publication Data

US 2023/0214734 A1    Jul. 6, 2023

Related U.S. Application Data

(63) Continuation of application No. 16/739,801, filed on Jan. 10, 2020, now Pat. No. 11,663,534.

(51) Int. Cl.
*G06Q 10/0631* (2023.01)
*G06N 20/00* (2019.01)
(Continued)

(52) U.S. Cl.
CPC ..... *G06Q 10/06311* (2013.01); *G06F 3/0486* (2013.01); *G06N 5/04* (2013.01);
(Continued)

(58) Field of Classification Search
None
See application file for complete search history.

(56) References Cited

U.S. PATENT DOCUMENTS 7,769,705 B1 *  8/2010  Luechtefeld ........... G06Q 10/06
                                                                706/47
7,885,844 B1    2/2011  Cohen et al.
(Continued)

FOREIGN PATENT DOCUMENTS

CN          106096911 B      2/2018
WO         WO-18235028 A1   12/2018

OTHER PUBLICATIONS

Munoz-Alcantara et al., "Peepdeck: a dashboard for the distributed design studio," 2016 Federated Conference on Computer Science and Information Systems (FedCSIS), 2016, pp. 1663-1670.

*Primary Examiner* — Chesiree A Walton
(74) *Attorney, Agent, or Firm* — MARSHALL, GERSTEIN & BORUN LLP

(57) ABSTRACT

A task management platform generates an interactive display tasks based on multi-team activity data of different geographic locations across a plurality of distributed guided user interfaces (GUIs). Additionally the task management platform uses a distributed machine-learning based system to determine a suggested task item for a remote team based on multi-team activity data of different geographic locations.

20 Claims, 10 Drawing Sheets

(51) Int. Cl.

| | |
|---|---|
| *G06N 5/04* | (2023.01) |
| *G06F 3/0486* | (2013.01) |
| *G06Q 10/0633* | (2023.01) |
| *G06F 3/14* | (2006.01) |
| *H04L 67/10* | (2022.01) |

(52) U.S. Cl.
CPC ......... *G06N 20/00* (2019.01); *G06Q 10/0633* (2013.01); *G06Q 10/063112* (2013.01); *G06Q 10/063114* (2013.01); *G06F 3/14* (2013.01); *H04L 67/10* (2013.01)

(56) References Cited

U.S. PATENT DOCUMENTS

| | | |
|---|---|---|
| 8,825,508 B2 | 9/2014 | Nilsson |
| 9,779,386 B2 | 10/2017 | Swierz, III et al. |
| 10,104,182 B1 | 10/2018 | Lowit et al. |
| 2008/0155547 A1 | 6/2008 | Weber et al. |
| 2014/0195946 A1 | 7/2014 | Herger et al. |
| 2014/0297395 A1 | 10/2014 | Chao et al. |
| 2017/0076234 A1 | 3/2017 | Pendell et al. |
| 2017/0116552 A1 | 4/2017 | Deodhar et al. |
| 2018/0129371 A1 | 5/2018 | Fowler et al. |
| 2018/0173372 A1* | 6/2018 | Greenspan .......... G06F 16/2465 |
| 2018/0268374 A1 | 9/2018 | Bjorkman et al. |
| 2019/0102425 A1* | 4/2019 | Obeidat .............. G06F 16/2428 |
| 2019/0286462 A1* | 9/2019 | Bodnick ................ G06F 9/453 |
| 2019/0340562 A1 | 11/2019 | Tayal et al. |
| 2019/0378348 A1 | 12/2019 | Fox et al. |
| 2020/0125586 A1* | 4/2020 | Rezaeian ............... G06F 3/048 |
| 2020/0210965 A1* | 7/2020 | Garber ............. G06Q 10/06315 |
| 2021/0406041 A1* | 12/2021 | Saraiya .................. G06F 9/451 |

* cited by examiner

Agent Homepage

| Leads | Quotes | Cancellation | Claims | Policy Changes | Renewals |
|---|---|---|---|---|---|
| 88 | 8 | 9 | 40 | 20 | 8 |

Data updated Jul 10, 2018 at 1:36 PM

Upcoming Simple Conversation — More

📅 Upcoming Simple Conversations
0 items, sorted by Simple Conversations Name

There's nothing in Upcoming Simple Conversations yet. When records are added to this list view, you'll see them here.

Cases by Case Origin

Service Request Origin (donut chart with segments: 32, 22, 16, 19, 9, 7, 10, 4)

As of Today at 11:36 AM

510

Open Service Tasks

Record Count (0–60)
Josh, Team, Leah, Manali, Mike, Jeff

Type: ☑Call ☰Email ✉Meeting ☑Prep ☐Other

520

As of Today at 11:36AM ↻

View Report

New Claims — More

📋 New Claims
2 items, sorted by Claim Name
Filtered by Record Type

C-000040
Policyholder: Broderick Jacobs
FNOL: 10/29/2018
Claim Type: Auto
Claim Sub Type: Property Damage
Claim Description:

C-000041
Policyholder: Broderick Jacobs
FNOL: 10/29/2018
Claim Type: Auto
Claim Sub Type: Property Damage
Claim Description: backed to a pole

Opportunities with No Next Steps

Opportunity Owner (donut chart with segments: 19, 2, 1, 1, 2, 1)

Today's Service Tasks — More

▦ Today's Service Tasks
0 items, sorted by Due Date
Filtered by Closed Recurring Parent...

There's nothing in Today's Service Tasks yet.

Cancellations

ARTIFICIAL INTELLIGENCE SYSTEMS AND METHODS CONFIGURED TO PREDICT TEAM MANAGEMENT DECISIONS

CROSS-REFERENCE TO RELATED APPLICATIONS

This application is a continuation of and claims priority to U.S. patent application Ser. No. 16/739,801, entitled "ARTIFICIAL INTELLIGENCE SYSTEMS AND METHODS CONFIGURED TO PREDICT TEAM MANAGEMENT DECISIONS" and filed on Jan. 10, 2020, the disclosure of which is hereby incorporated by reference herein in its entirety.

FIELD OF THE DISCLOSURE

The present disclosure generally relates to big data and cloud-based platforms and, more particularly, to a big-data and cloud based platforms for generating guided user interfaces (GUIs) and notifications at the GUIs.

BACKGROUND

Typical office management software and/or platforms provide general office task assignment, planning and management capabilities, but fail to provide cross-platform, and cross business, solutions. Additionally, typical office management software and/or platforms fail to collect adequate metrics. Consequently, such office management software and/or platforms typically constitute waste in the form of end user (e.g., office personnel, agent(s), etc.) manual work and/or use, training, and/or dependency on multiple, disparate management software and/or platforms which leads to numerous inefficiencies. Additionally, office task management efficiencies or inefficiencies are based on end users' cognitive recall and manual best practices. If end users are abruptly unavailable, there are inadequate records of task assignment, planning, and status which creates complexity. For example, end users generally require and rely on various manual processes and paper work to manage their business and office staff. Conventional management software products generally fail provide comprehensive and business-need specific solutions that help end users manage their office and business effectively. For example, such office software management products are generally narrowly focused, and have limited capabilities, and, thus, require an office to utilize multiple software products which can lead to inefficiencies, including redundancies and desynchronized data. In addition, data failures and redundancy in such office management products leads to potential errors and/or poor insights into real-time statuses of a plurality of business issues. For example, end users may be forced to manually synthesize/derive the information from paper files or non-integrated office management software products to perform evaluations or analysis, e.g., such as evaluating a team member's performance or assigning and reassigning tasks.

For the foregoing reasons, there is a need for task management systems and methods configured to generate integration GUIs.

SUMMARY

As disclosed herein, task management platform is configured for generation of GUIs. In an embodiment, a distributed machine-learning based system for determining a suggested task item for a remote team based on multi-team activity data of different geographic locations is described. The system includes a server communicatively coupled to a computer network; a first dashboard application configured to execute on a first client device in communication with the server over the computer network; and a second dashboard application configured to execute on a second client device in communication with the server over the computer network. The server is configured to execute instructions to: receive, from the computer network, from the first dashboard application, activity data defining a first set of interactive display tasks of a first team at a first geographic location, train a machine-learning model based on the activity data defining the first set of interactive display tasks of the first team, and receive, from the computer network, from the second dashboard application, activity data defining a second set of interactive display tasks of a second team at a second geographic location. The server is further configured to: generate a suggested interactive display task including a suggested task item for assignment to at least one team member of the second team, wherein the suggested interactive display task is determined by the trained machine learning model based on the activity data defining the second set of interactive display tasks of the second team, and transmit, to the second dashboard application, the suggested task item.

The server may be further configured to: generate a first set of feature data and a first set of label data based on the activity data defining the first set of interactive display tasks. The machine-learning model may be trained based on at least the first set of feature data and the first set of label data. The first set of label data may comprise one or more task items of one or more members of the first team, and wherein the first set of feature data comprises trigger data that triggered generation of the one or more task items.

The system may further include a third dashboard application configured to execute on a third client device in communication with the server over the computer network. The server may be further configured to execute instructions to: receive, from the computer network, from the third dashboard application, activity data defining a third set of interactive display tasks of a third team at a third geographic location, and train the machine-learning model based on the activity data defining the first set of interactive display tasks of the first team and activity data defining the third set of interactive display tasks of the third team.

The system may further include a third dashboard application configured to execute on a third client device in communication with the server over the computer network. The server may be further configured to execute instructions to: generate an additional suggested interactive display task including an additional suggested task item for assignment to at least one team member of the third team, wherein the additional suggested interactive display task is determined by the trained machine learning model based on the activity data defining the third set of interactive display tasks of the third team, and transmit, to the third dashboard application, the additional suggested task item.

The server may be further configured to: determine a similarity metric based on at least a portion of characteristics defining the first team of the first geographic location and at least a portion of characteristics defining the second team of the second geographic location, and in response to the similarity metric being above a threshold, determine the suggested interactive display task. The characteristics of the first team may include first team geographic location characteristics, first team size characteristics, and first team member characteristics; and the characteristics of the second team may include second team geographic location characteristics, second team size characteristics, and second team member characteristics.

The server may be further configured to execute instructions to: determine a first outcome value based on activity data defining a first set of interactive display tasks of a first team, determine a second outcome value based on activity data defining the second set of interactive display tasks of the second team, and in response to the first outcome value being higher than the second outcome value, determine the suggested interactive display task.

In another embodiment, a distributed machine-learning based method for determining a suggested task item for a remote team based on multi-team activity data of different geographic locations is described. The method includes: receiving, at a server from a first dashboard application, activity data defining a first set of interactive display tasks of a first team at a first geographic location, wherein the first dashboard application executes on a first client device in communication with the server and training, at the server, a machine learning model based on the activity data defining the first set of interactive display tasks of the first team. The method further includes: receiving, at the server from a second dashboard application, activity data defining a second set of interactive display tasks of a second team at a second geographic location, wherein the second dashboard application executes on a second client device in communication with the server; generating, at the server, a suggested interactive display task including a suggested task item for assignment to at least one team member of the second team, wherein the suggested interactive display task is determined by the trained machine learning model based on the activity data defining the second set of interactive display tasks of the second team; and transmitting, from the server to the second dashboard application, the suggested task item.

The method may further comprise: generating, at the server, a first set of feature data and a first set of label data based on the activity data defining the first set of interactive display tasks of the first team; and training the machine learning model based on at least the first set of feature data and the first set of label data. The first set of label data may comprise one or more task items of one or more members of the first team, and wherein the first set of feature data comprises trigger data that triggered generation of the one or more task items.

The method may further comprise: receiving, at the server from a third dashboard application, activity data defining a third set of interactive display tasks of a third team at a third geographic location, wherein the third dashboard application executes on a third client device in communication with the server; and training the machine-learning model based on the activity data defining the first set of interactive display tasks of the first team and activity data defining the third set of interactive display tasks of the third team.

The method may further comprise: receiving, at the server from a third dashboard application, activity data defining a third set of interactive display tasks of a third team at a third geographic location, wherein the third dashboard application executes on a third client device in communication with the server; generating, at the server, an additional suggested interactive display task including an additional suggested task item for assignment to at least one team member of the third team, wherein the additional suggested interactive display task is determined by the trained machine learning model based on the activity data defining the third set of interactive display tasks of the third team, and transmitting, from the server to the third dashboard application, the additional suggested task item.

The method may further comprise: determining, at the server, a similarity metric based on at least a portion of characteristics defining the first team and at least a portion of characteristics defining the second team, and in response to the similarity metric being above a threshold, determining, at the server, the suggested interactive display task. The characteristics of the first team may include first team geographic location characteristics, first team size characteristics, and first team member characteristics; and the characteristics of the second team may include second team geographic location characteristics, second team size characteristics, and second team member characteristics.

The method may further comprise: determining, at the server, a first outcome value based on activity data defining a first set of interactive display tasks of a first team; determining, at the server, a second outcome value based on activity data defining the second set of interactive display tasks of the second team; and in response to the first outcome value being higher than the second outcome value, determining, at the server, the suggested interactive display task.

In yet another embodiment, a tangible, non-transitory computer-readable medium storing instructions for a distributed machine-learning based system for determining a suggested task item for a remote team based on multi-team activity data of different geographic locations is described. The instructions, when executed by one or more processors of a computing device, cause the computing device to: receive, from a first dashboard application, activity data defining a first set of interactive display tasks of a first team at a first geographic location, wherein the first dashboard application executes on a first client device in communication with the server; train a machine learning model based on the activity data defining the first set of interactive display tasks of the first team; and receive, from a second dashboard application, activity data defining a second set of interactive display tasks of a second team at a second geographic location, wherein the second dashboard application executes on a second client device in communication with the server. The instructions, when executed by one or more processors of a computing device, further cause the computing device to: generate a suggested interactive display task including a suggested task item for assignment to at least one team member of the second team, wherein the suggested interactive display task is determined by the trained machine learning model based on the activity data defining the second set of interactive display tasks of the second team; and transmit, from the server to the second dashboard application, the suggested task item.

The instructions when executed may further cause the computing device to: generate a first set of feature data and a first set of label data based on the activity data defining a first set of interactive display tasks of the first team; and train the machine learning model based on at least the first set of feature data and a first set of label data. The first set of label data may comprise one or more task items of one or more members of the first team, and the first set of feature data may comprise trigger data that triggered generation of the one or more task items.

The instructions when executed may further cause the computing device to: receive, from a third dashboard application, activity data defining a third set of interactive display tasks of a third team at a third geographic location, wherein the third dashboard application executes on a third client device in communication with the server; and train the machine-learning model based on the activity data defining the first set of interactive display tasks of the first team and activity data defining the third set of interactive display tasks of the third team.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 5 illustrates an exemplary embodiment of a GUI displaying a dashboard for a team at a geographic location including metrics for individual team members in accordance with various embodiments disclosed herein.

DETAILED DESCRIPTION

Figure 1:
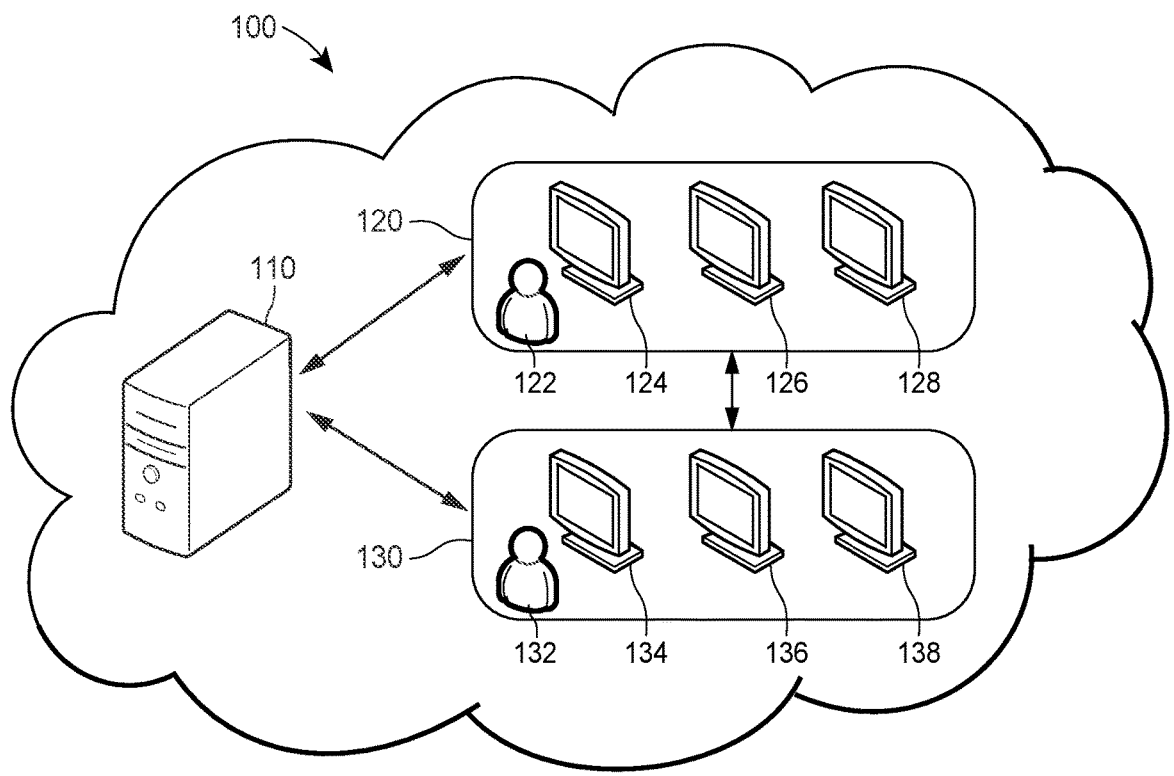
FIG. 1 illustrates an exemplary environment of a task management system configured to generate GUIs in accordance with various embodiments disclosed herein.

FIG. 1 illustrates an exemplary environment of a task management system configured to generate GUIs in accordance with various embodiments disclosed herein. The system may be a cloud based system configured to generate new or transformed GUIs based on a data generated, recorded, and/or aggregated from various different platforms (e.g., one or more computing devices associated with a first team at a first geographic location and/or one or more computing devices associated with a second team at a second geographic location) where the new integration data is enhanced with an enhanced, cross-platform integration format. Each of the disparate data sources may provide data for integration via a variety of communication protocols and in a variety of different communication or data types, including, but not limited to, push-based data, pull-based data, and message, queuing, and/or event based data. Generally, push-based data is data that is transmitted, without a request, from a source, platform service, or other computing device. Pull-based data, in contrast, is data that is transmitted, based on a request, from a source, platform service, or other computing device. Queue or event based data (i.e., queue based data and/or a queue event) is data that has been scheduled, in relation to other events or data, and is transmitted in a determined order (e.g., a first-in-first out order or a last-in-last out order). Such data may be ingested by a big-data view integration platform as described herein.

The task management system 100 may include a server 110. In various embodiments, the GUIs of the task management platform, including integration GUIs, as described herein, may be implemented in Hypertext Markup Language (HTML), JavaScript, etc. The task management platform may be implemented via client-server technologies, such a Tomcat J2EE Servlet container, Java Server Pages (JSP), Active Server Pages (ASP), or other client-server technologies. The GUIs of task management platform may communicate with task management platform via client-server requests and responses, asynchronous calls (e.g., via asynchronous JavaScript and extensible markup language (XML), i.e., AJAX calls), and/or via representational state transfer (RESTful) application programming interfaces (APIs). Any of the push data, pull data, and/or queue based data may be stored in databases such as IBM's DB2, Oracle, MySQL, MongoDB, other SQL-based or NoSQL-based database, or other data stores. In general, the server or backend components of the task management platform may provide common core features across all "AST Application Layer" to provide data for, e.g., for digital whiteboard GUIs or other such integration GUIs and/or non-integration GUIs, etc.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

The task management system includes a first team 120 and a second team 130. Each of the first team 120 and the second team 130 may be located at locations geographically remote from one another. Optionally, the task management system may include three or more teams. The additional teams may also be located geographically remote from one another and from the first team 120 and the second team 130. Each team includes one or more team members (e.g., team member 122 of the first team 120 and team member 132 of the second team 130). At least one member of each team may be a team manager. Additionally, one or more members of each team may be employees.

Each team is associated with at least one client device (e.g., team 120 may be associated with client devices 124, 126, and 128, and team 130 may be associated with client devices 134, 136, and 138). Each client device is configured to execute a dashboard application and each client device is in communication with the server 110. The dashboard application operating on the one or more client devices, 124, 126, and 128, associated with the first team 120 and the dashboard application operating on the one or more client devices 134, 136, and 138 associated with the second team 130 may execute a common set of instructions to render the associated GUIs.

The dashboard application may be configured to implement at a display of each client device e.g., client devices 124, 126, 128, 134, 136, and 138) a GUI displaying a set of interactive display tasks. The interactive display tasks may be rendered as a set of drag and drop windows at the GUI. Each interactive display task may include a task item for assignment to at least one member of a team (e.g., team member 122 of the first team 120 and team member 132 of the second team 130.)

Additionally, the dashboard application may be configured to transmit, from the client device to the server 110, activity data defining a set of interactive display tasks of the team associated with the client device. For example, each client device may be configured to transmit activity data based on the interaction of one or more team member with the GUI of the client device.

The server 110 may receive activity data from the first team 120 defining the set of interactive display tasks and the server 110 may train a machine-learning model. The server 110 may train the machine learning model by, for example, generating a first set of feature data and a first set of label data based on the activity data and train the machine-learning model based on at least the first set of feature data and the first set of label data. The label data may comprise one or more task items of one or more members of the first team 120, and the feature data may comprise trigger data that triggered generation of the one or more task items. For example, the first set of label data may be a task for a member 122 of the first team 120 to respond to a claim made by a customer and the feature data may comprise a call from a customer making a claim.

Based on the trained model and the activity data from the second team 130, the server 110 may generate one or more suggested interactive display tasks including a suggested task item for assignment to at least one team member 132 of the second team 130. The suggested task item may be a suggested staffing related task, a suggested compensation related task, a suggested employee training related task, or a suggested workflow related task. For example, the suggested task item may add an additional task for completion by a member of the second team 130, a reassignment of a task to another team member of the second team 130, a hiring suggestion for a new team member of the second team 130, a training or licensing session for a member of the second team 130, and/or a change in compensation for a member of the second team 130. Further, the suggested task item may also include a suggested team member for assignment to the suggested task item. The suggested team member may be determined based on a licensing and compliance status of the suggested team member, a skill profile of the team member, and/or a workload capacity of the team member.

Optionally, the server 110 may determine a first outcome value based on activity data of the first team 120, determine a second outcome value based on activity data of the second team 130, and in response to the first outcome value being higher than the second outcome value, determine the suggested interactive display task. For example, the server 110 may determine a time efficiency, a resource efficiency, and/or a customer satisfaction of the first team 120 and the second team 130. In response to the time efficiency, the resource efficiency, and/or the customer satisfaction being higher for the first team 120 than the second team 130, the server 110 may determine the suggested interactive display task.

Additionally, the server 110 may determine a similarity metric based on at least a portion of characteristics of the first team 120 and at least a portion of characteristics of the second team 130; and in response to the similarity metric being above a threshold, generate the suggested interactive display task. The characteristics may include team geographic location characteristics, team size characteristics, and team member characteristics. For example, the server 110 may determine that the first team 120 and the second team 130 have a similar number of team members, are located in similar metropolitan areas, and/or have a similar team structure and in response to this determination, the server 110 may determine the suggested interactive display task.

Additionally, each client device may be able to receive data from the server 110. The data received from the server 110 may be based on activity data received from one or more other client device associated with one or more other team. Each client device may receive, from the server 110, a suggested interactive display task. Each dashboard application executing on each client device may be configured to, in response to authorization of the suggested interactive display task at the client device, add the suggested interactive display task to the set of interactive display tasks including rendering the suggested interactive display task on the second GUI as a new drag and drop window.

Each client device may be configured such that the interface of the client device system allows a user of the client device to assign, reassign, and manage tasks associated with a team associated with the client device. Additionally, the interactive display of the client device may display a suggested task item for assignment to at least one team member of the team associated with the client device. Additionally, the interface may display the progress, the assignment, the importance, the due date, and any other information associated with a task required by the team associated with the client device.

Additionally, when the system includes three or more teams, the machine learning model may be further trained based on the activity data from the three or more teams, the suggested interactive display task including the suggested task item may be determined from the activity data from the three or more teams, and the dashboard application may present a suggested task item to any of the three or more teams.

Figure 2:
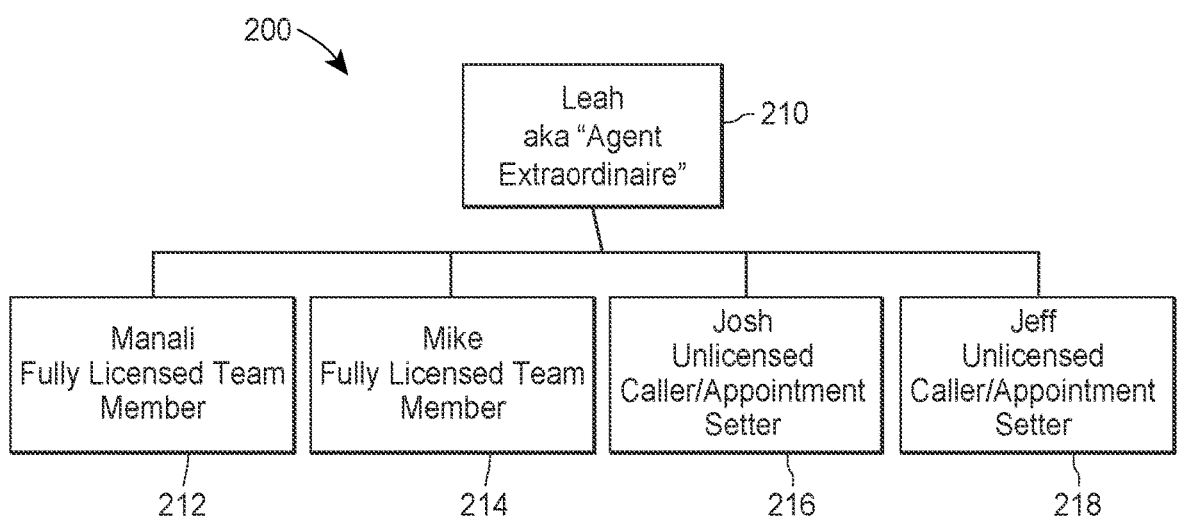
FIG. 2 illustrates an exemplary chart of a team at a geographic location in accordance with various embodiments disclosed herein.

FIG. 2 illustrates an exemplary chart 200 of a team (e.g., team 120 and team 130) at a geographic location in accordance with various embodiments disclosed herein. Each team may include a team manager 210. The team manager 210 may assign, reassign, and otherwise manage tasks associated with the team. The team manager 210 may assign, reassign, and manage tasks via a user interface of a client device (e.g., client device 124). Further, the team manager 210 may monitor the progress or status of tasks via the user interface of the client device (e.g., client device 124). The team manager 210 may also receive, at the client device (e.g., client device 124), one or more suggested task items from the server 110.

The team may also include one or more team member (e.g. team members 212, 214, 216, and 218). Each team member may have one or more defining characteristics such as "veteran team member" and "3 months in the role." Additionally, each team member 212, 214, 216, and 218 may have one or more status such as "fully licensed team member" and "unlicensed caller/appointment settler." The team manager 210 may assign tasks to each of the one or more team members 212, 214, 216, and 218 based on defining characteristics and statuses of the team members 212, 214, 216, and 218. Each of the one or more other team members 212, 214, 216, and 218 may access or modify the progress of one or more tasks via a user interface of the client device (e.g., client device 126). For example, the one or more team members 212, 214, 216, and 218 can indicate that a task is in progress or has been completed.

Figure 3:
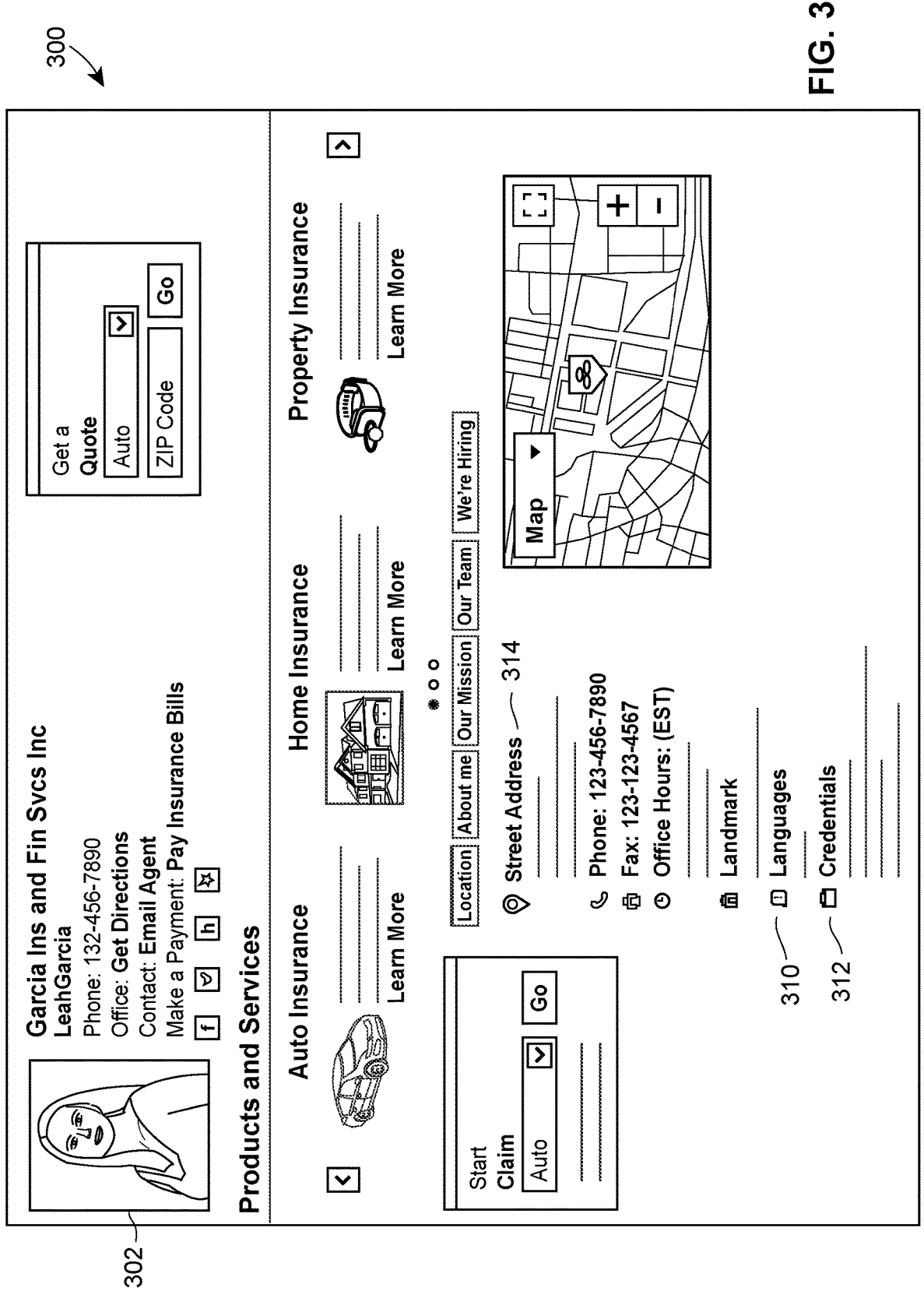
FIG. 3 illustrates an exemplary embodiment of a GUI displaying a profile of a member of a team at a geographic location in accordance with various embodiments disclosed herein.

FIG. 3 illustrates an exemplary embodiment of a GUI 300 displaying a profile of a member of a team 302 at a geographic location in accordance with various embodiments disclosed herein. The GUI 300 may include interactive buttons (e.g., buttons 310 and 312) that provide more information about the team member 302. The GUI 300 may include information about the team with which the team member 302 is associated. Team information may comprise a geographic location of the team 314.

Figure 4:
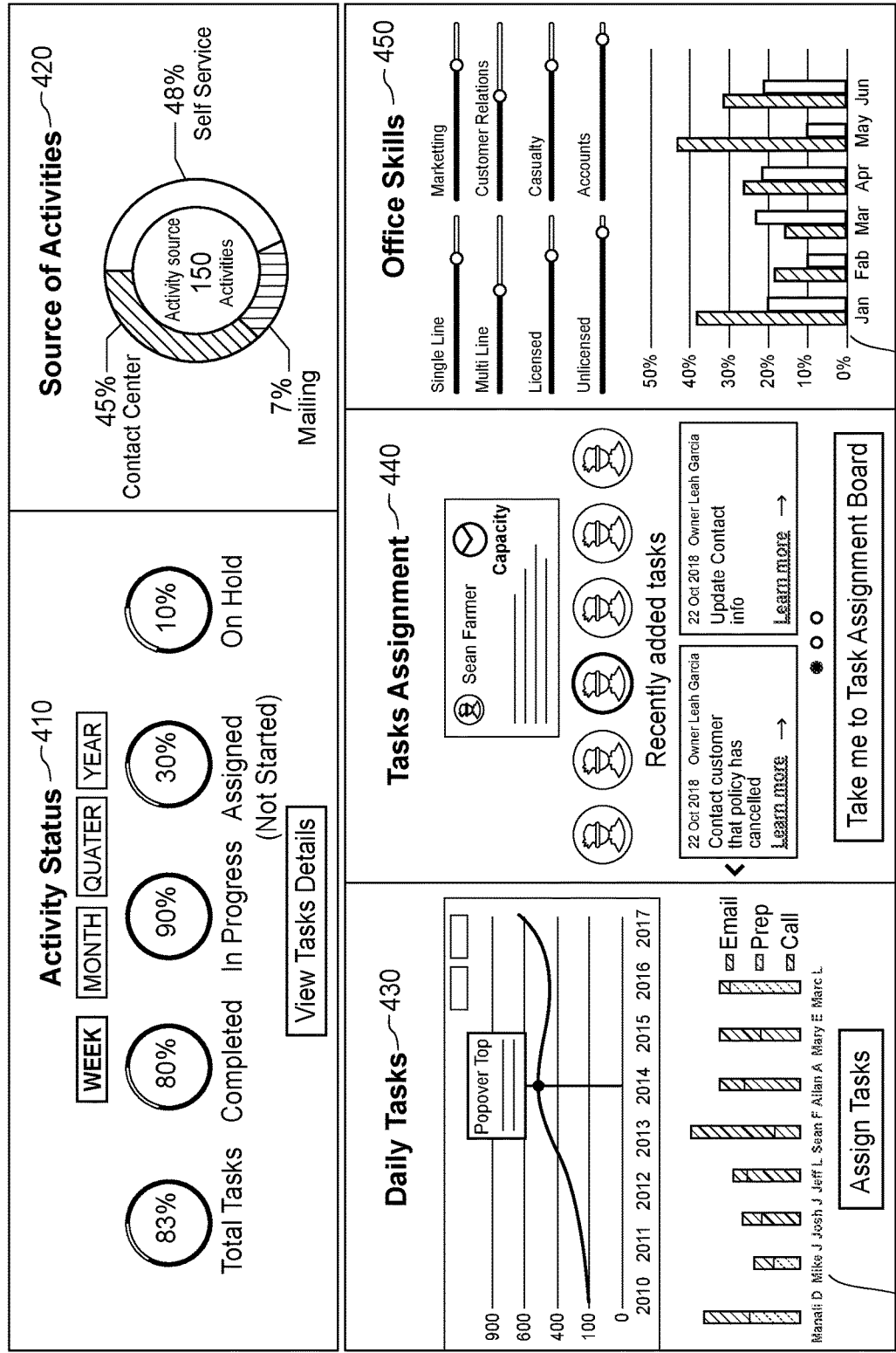
FIG. 4 illustrates an exemplary embodiment of a GUI displaying a dashboard associated with a team at a geographic location in accordance with various embodiments disclosed herein.

FIG. 4 illustrates an exemplary embodiment of a GUI displaying a dashboard 400 associated with a team at a geographic location in accordance with various embodiments disclosed herein. This dashboard may be accessed by the team leader 210 of a team. The dashboard 400 may include an activity status 410 of the one or more activities to be completed by the team. The status of the activities may be "completed," "in progress," "assigned (not started)," and "on hold." The dashboard may also include a source of activities 420. Optionally, a status of an activity may include a suggested task item generated by the server 110 and based on activity data from one or more other geographic locations. The dashboard may include daily tasks 430. The daily tasks may show each member of a team and the number of tasks assigned to that member of the team 432. Additionally, the dashboard 400 may include task assignment 440 and office skills 450. Office skills may include the percentage of team members of each team proficient in one or more skills 452. Interaction with the dashboard 400 may result in the collection of activity data collected by the client device and sent to the server 110. FIG. 5 illustrates an example embodiment of a GUI associated with a dashboard 500 for a team at a geographic location including all members of the team. Dashboard 500 may be another view of dashboard 400. Dashboard 500 may be additionally available to team leader 210 and provide further information about source of activities 520 and the tasks assigned to each member of a team 530.

Figure 6:
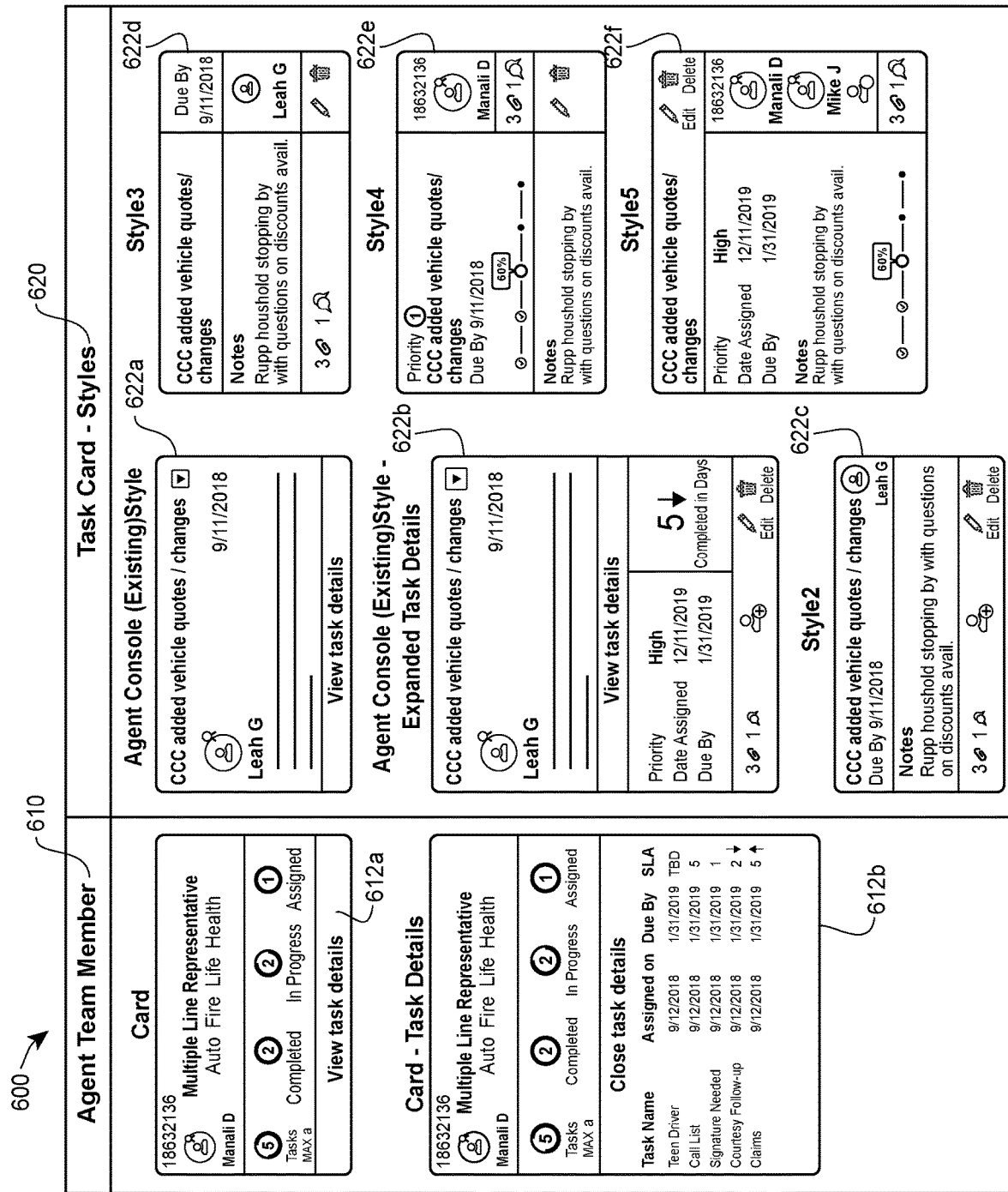
FIG. 6 illustrates an exemplary chart of options associated with team member identifiers and task identifiers in accordance with various embodiments disclosed herein.

FIG. 6 illustrates an exemplary chart 600 of options associated with team member identifiers and task identifiers in accordance with various embodiments disclosed herein. Portion 610 of the chart 600 includes information associated with a team member associated with a team at a geographic location. The information associated with a team member may include the tasks associated with the team member. Each team member may be denoted by a card such as member card 612a and 612b. Each member card 612a and 612b may be personalized or otherwise altered such that each member card 612a and 612b shows more or less information. For example, a member card may optionally show only a team members current workflow and availability or each member card may show each task associated with the member. Portion 620 of the chart 600 includes information associated with tasks to be completed. Each task may be denoted by a task card such as card 622a-e. Each task card 622a-e may include more or less information about the task.

Figure 7:
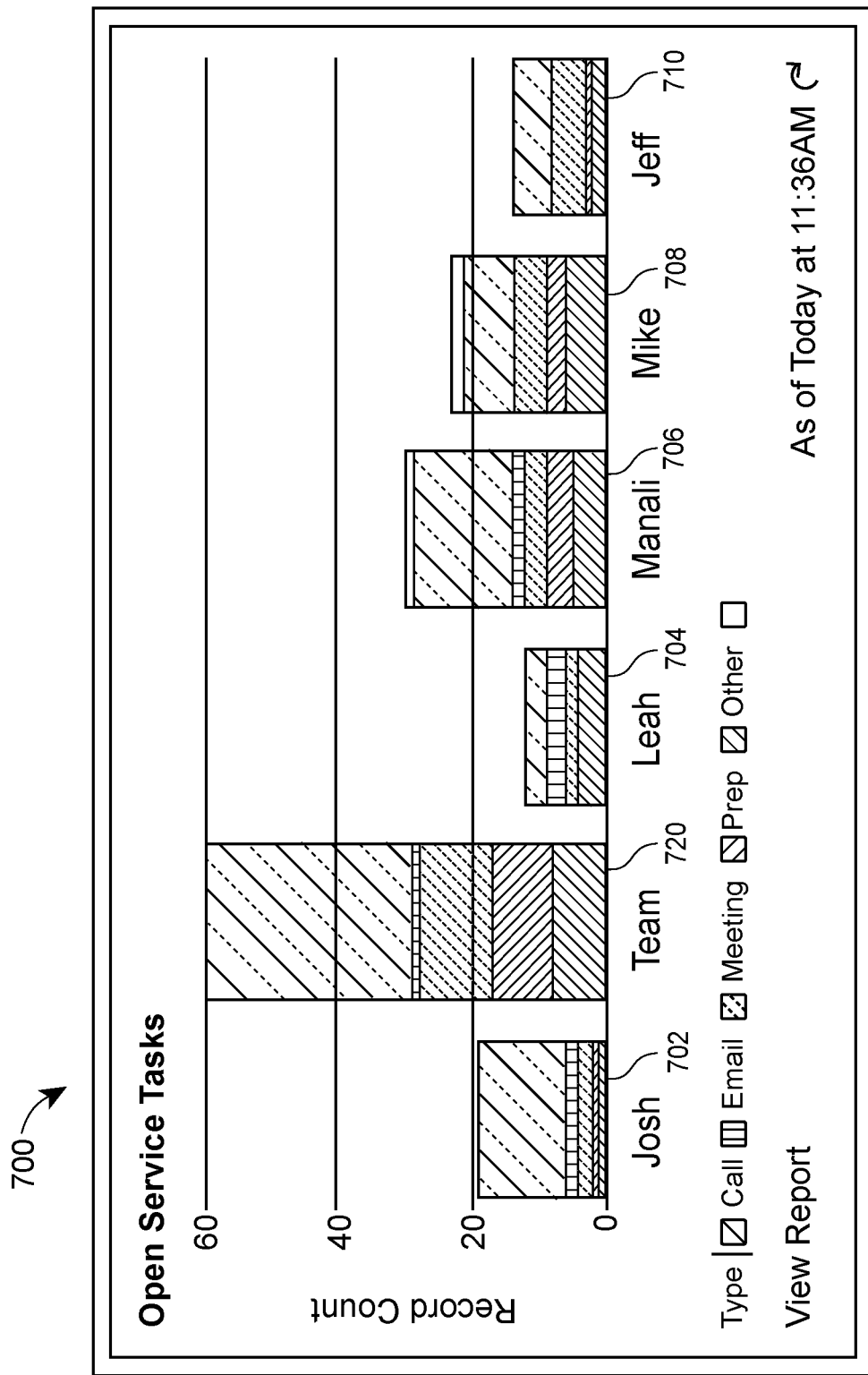
FIG. 7 illustrates an exemplary embodiment of a portion GUI displaying a dashboard associated with member workflow and availability information for a team at a geographic location in accordance with various embodiments disclosed herein.

FIG. 7 illustrates an exemplary embodiment of a portion GUI displaying a dashboard 700 associated with member workflow and availability information for a team at a geographic location in accordance with various embodiments disclosed herein. The portion of the dashboard 700 may be from dashboard 500. The portion of the dashboard 700 may show information associated with a workload of multiple team members 702, 704, 706, 708, and 710. Each member of a team may have one or more types of tasks assigned to the member. Task types may include "call" "email" "meeting" "prep" or "other." The workload may be a daily workload, a weekly workload, or a workload over any other timeframe. Additionally, the workload may be depicted for a team 720 as a whole.

Figure 8:
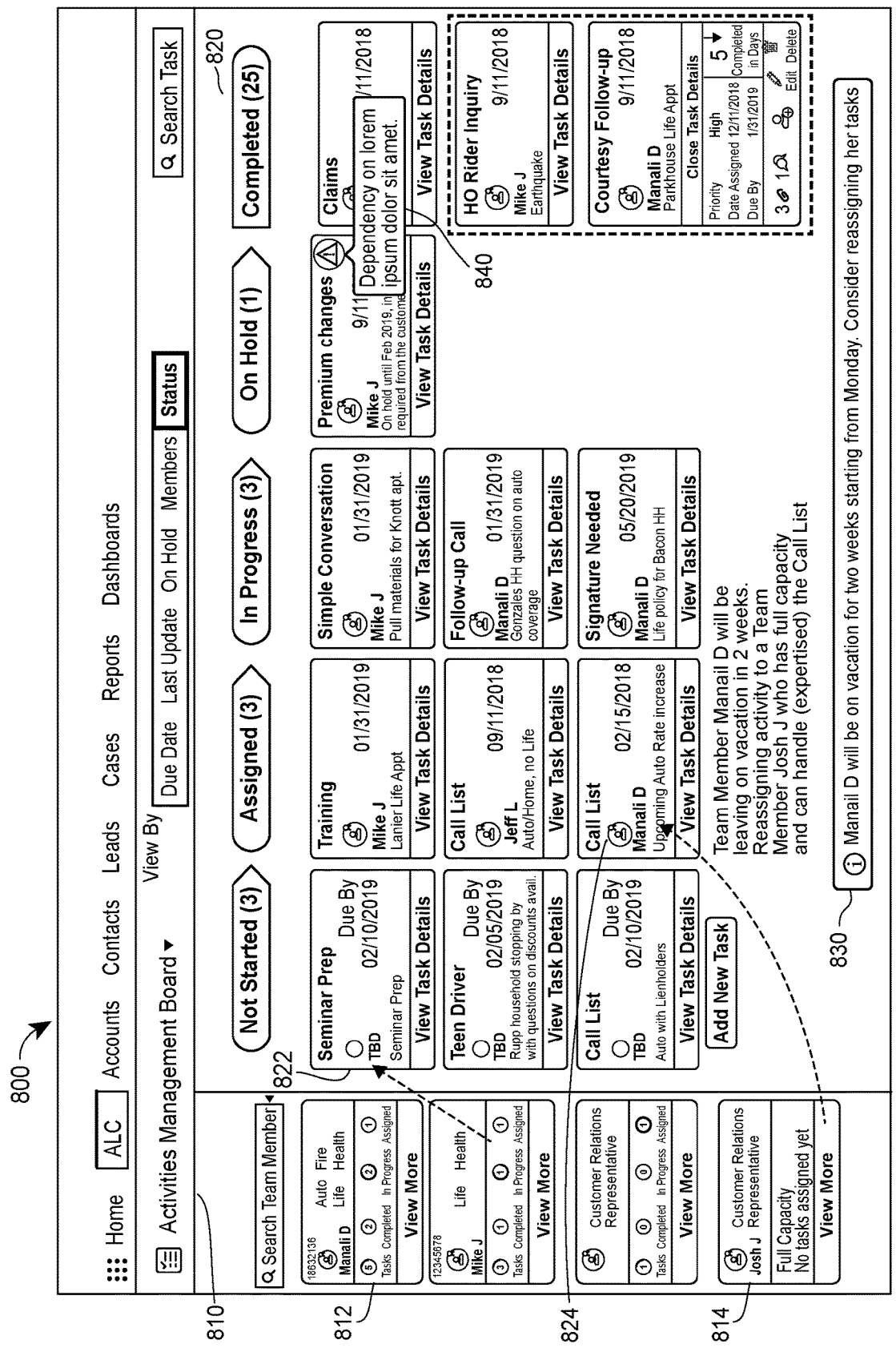
FIG. 8 illustrates an exemplary embodiment of a GUI displaying a dashboard associated with task assignment for a team at a geographic location in accordance with various embodiments disclosed herein.
Figure 9:
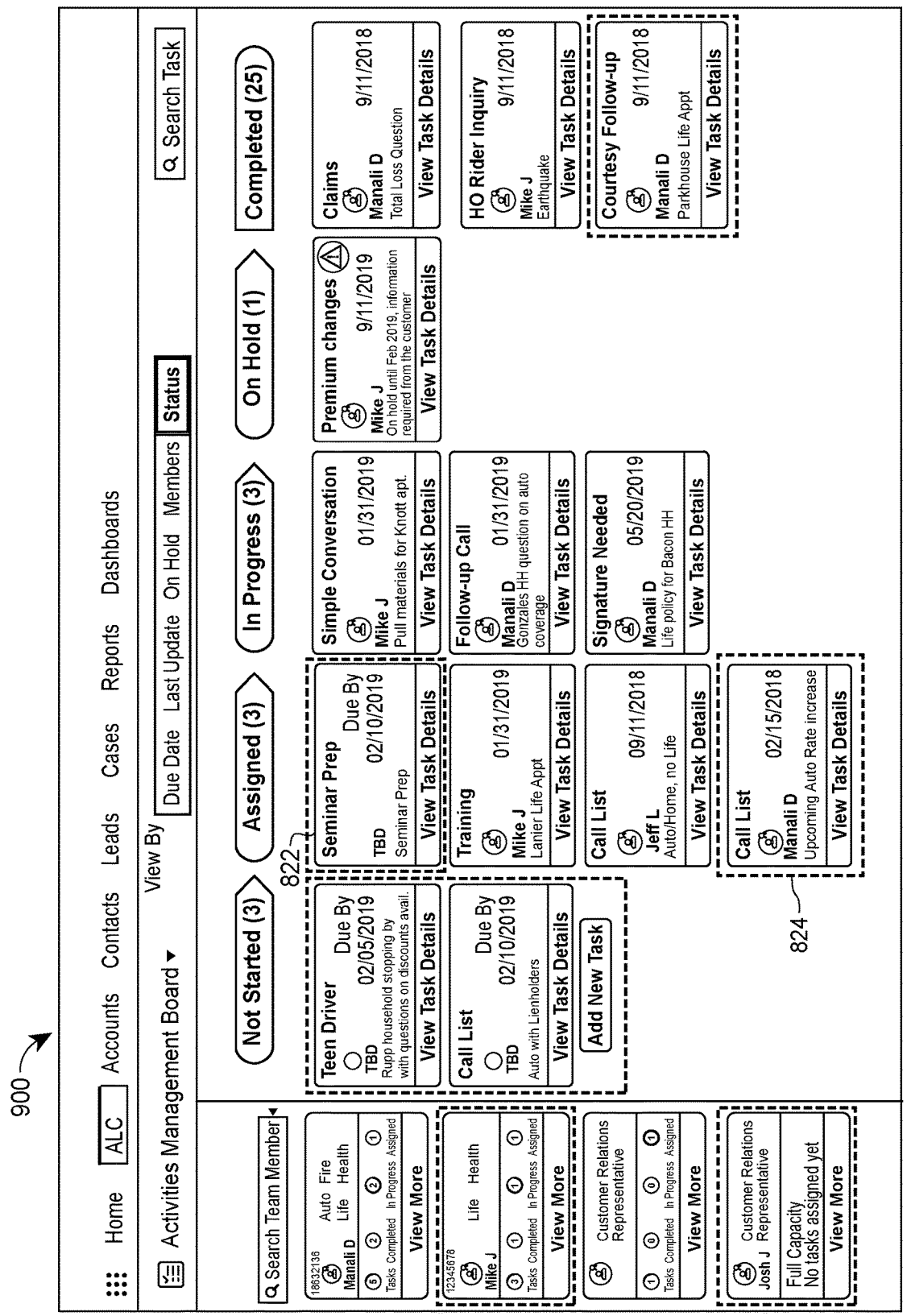
FIG. 9 illustrates the exemplary embodiment of a GUI displaying a dashboard associated with task assignment for the team FIG. 8 after assignment of tasks via the dashboard in accordance with various embodiments disclosed herein.

FIG. 8 illustrates an exemplary embodiment of a GUI displaying a dashboard 800 associated with task assignment for a team at a geographic location in accordance with various embodiments disclosed herein. Dashboard 800 may include a first portion 810 including information associated with team members associated a team. Each team member may be described by a virtual card (e.g., 812 and 814) of the dashboard 800. Dashboard 800 may include a second portion 820 including information associated with one or more tasks associated with a team at a geographic location. Each of the one or more tasks may be described by a virtual card (e.g., 822 and 824) of dashboard 800. A team leader 210 may assign or reassign a task to a team member by dragging and dropping the team member card onto the team task card. Additionally, dashboard 800 may include additional information related to staffing 830. For example, the dashboard 800 may include a notification 830 that a team member may be out of town or otherwise unavailable. Additionally, one or more task cards may include a notification 840 indicating an update to the task. FIG. 9 illustrates the exemplary embodiment of a GUI displaying a dashboard 900 associated with task assignment for the team FIG. 8 after assignment of tasks via the dashboard in accordance with various embodiments disclosed herein. After assignment, task card 822 may move to the assigned position and may be assigned to a team member. Additionally, after reassignment, task card 824 may be assigned to a new team member.

Figure 10:
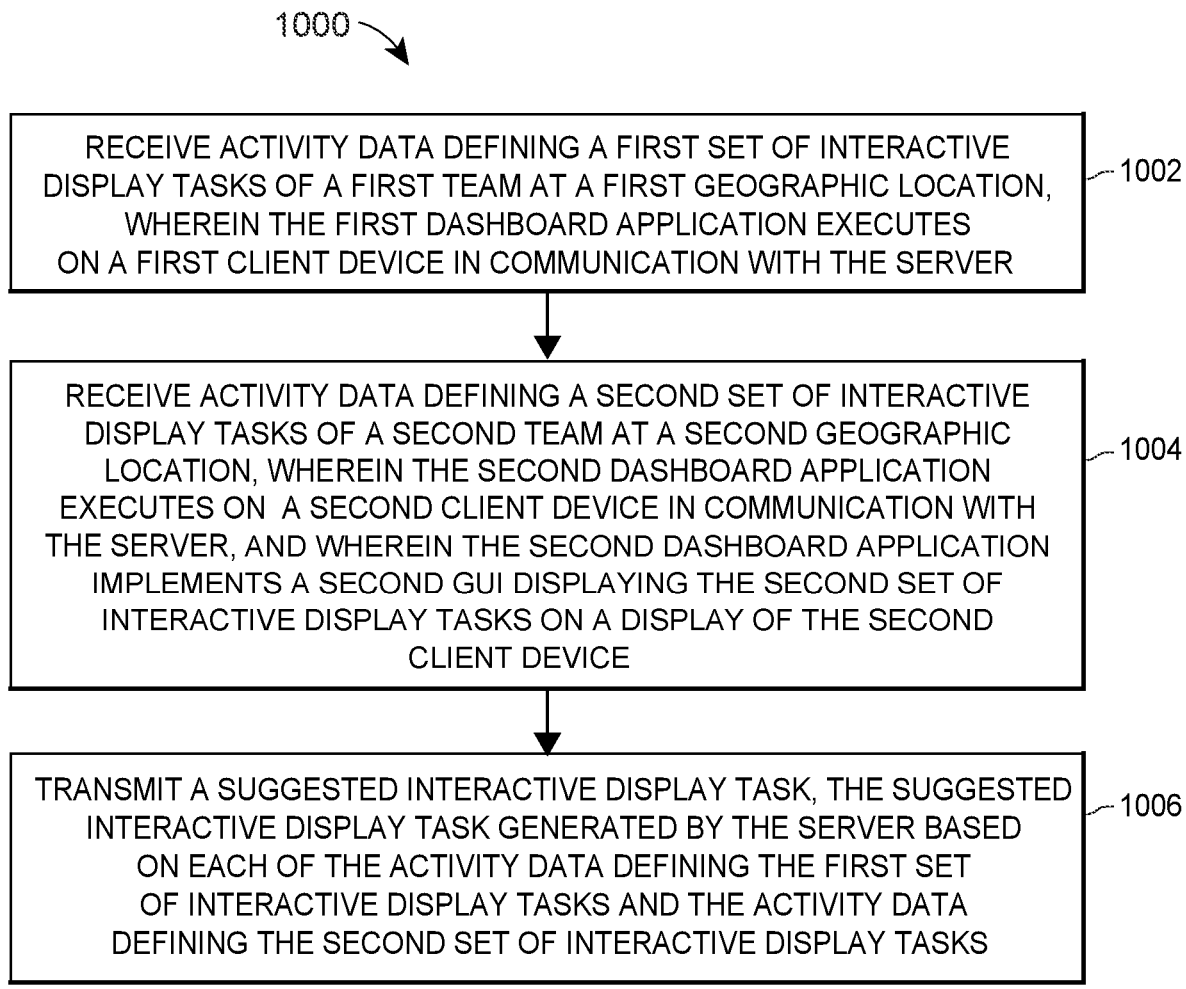
FIG. 10 illustrates an exemplary flow-diagram associated with the task management system of FIG. 1 in accordance with various embodiments disclosed herein.

FIG. 10 illustrates an exemplary flow-diagram 1000 associated with the task management system of FIG. 1 in accordance with various embodiments disclosed herein.

At step 1002, a server (e.g., server 110) may receive activity data defining a first set of interactive display tasks of a first team at a first geographic location, wherein the first dashboard application executes on a first client device in communication with the server. Next, at step 1004, the server may receive activity data defining a second set of interactive display tasks of a second team at a second geographic location, wherein the second dashboard application executes on a second client device in communication with the server, and wherein the second dashboard application implements a second GUI displaying the second set of interactive display tasks on a display of the second client device. Finally, at step 1006, the server may transmit a suggested interactive display task, the suggested interactive display task generated by the server based on each of the activity data defining the first set of interactive display tasks and the activity data defining the second set of interactive display tasks.

Figure 11:
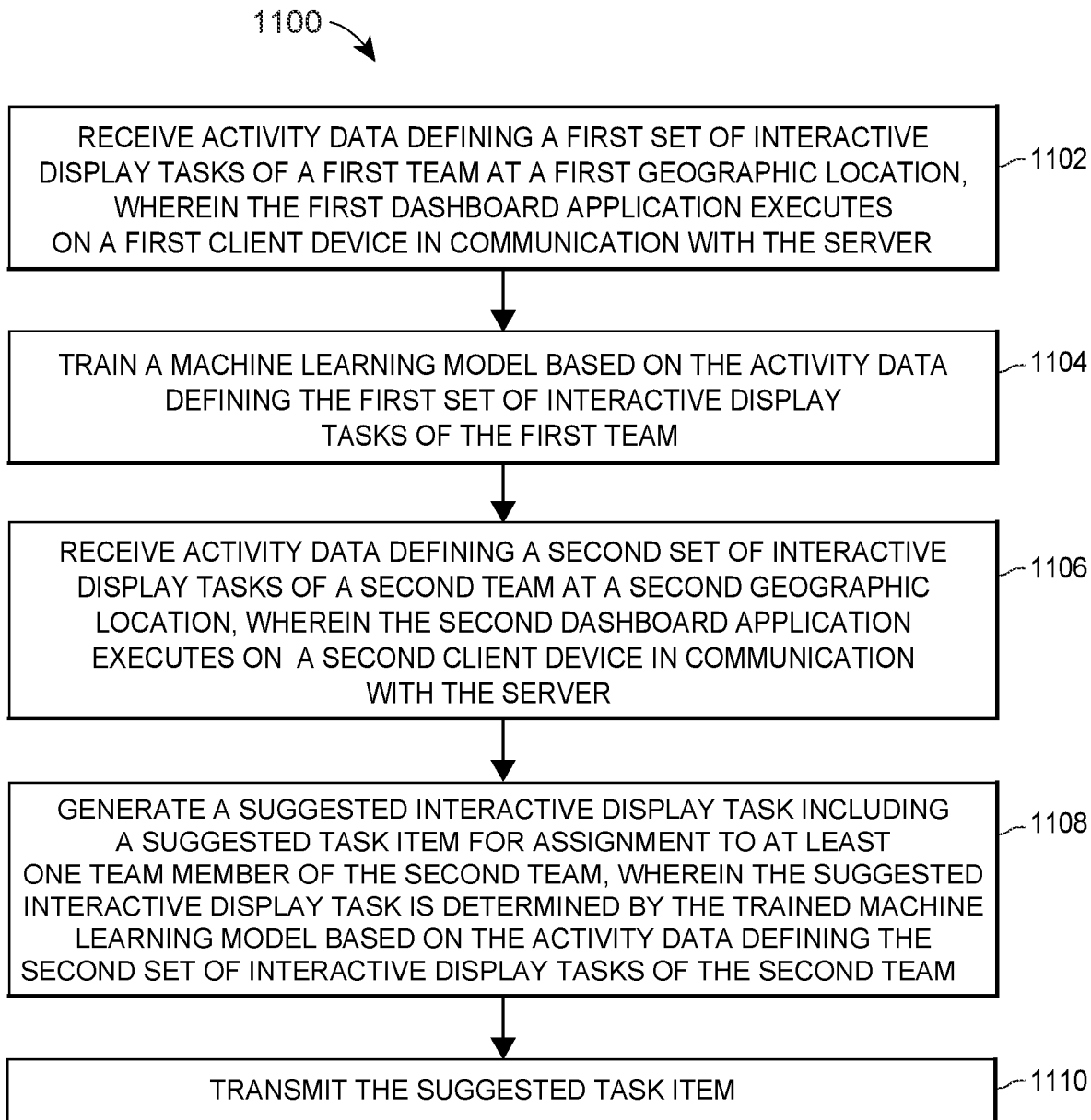
FIG. 11 illustrates another exemplary flow-diagram associated with the task management system of FIG. 1 in accordance with various embodiments disclosed herein.

FIG. 11 illustrates another exemplary flow-diagram 1100 associated with the task management system of FIG. 1 in accordance with various embodiments disclosed herein.

At step 1102, a server (e.g., server 110) may receive activity data defining a first set of interactive display tasks of a first team at a first geographic location, wherein the first dashboard application executes on a first client device in communication with the server. At step 1004, the server may train a machine learning model based on the activity data defining the first set of interactive display tasks of the first team. Next, at step 1006, the server may receive activity data defining a second set of interactive display tasks of a second team at a second geographic location, wherein the second dashboard application executes on a second client device in communication with the server. At step 1008, the server may then generate a suggested interactive display task including a suggested task item for assignment to at least one team member of the second team, wherein the suggested interactive display task is determined by the trained machine learning model based on the activity data defining the second set of interactive display tasks of the second team. Finally, at step 1110, the server may transmit the suggested task item.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A machine-learning based system for presenting a suggested task via a graphical user interface (GUI), the system comprising:
    a dashboard application configured to execute on a client device of a first user, the dashboard application being in communication with a server over a computer network;
    wherein, the server is configured to execute instructions to:
    train a machine-learning model to suggest tasks based on (1) first activity data defining a first set of tasks of a first plurality of users other than the first user, and (2) trigger data that triggered generation of one or more tasks from among the first set of tasks of the first plurality of users,
    receive, via the computer network, from the dashboard application, second activity data defining a second set of tasks of a second plurality of users other than the first user, the second plurality of users being associated with the first user,
    generate a suggested task for assignment by the first user to at least one user among the second plurality of users, wherein the suggested task is determined by the trained machine-learning model based on the second activity data, and
    provide, to the dashboard application at the client device of the first user, the suggested task to cause the dashboard application to display a drag-and-drop interface to enable the first user to assign the suggested task to a selected user from among the second plurality of users via one or more drag-and-drop interactions with the GUI.

2. The machine-learning based system of claim 1, wherein the instructions to train the machine-learning model include instructions to train the model to suggest tasks further based upon geographic location characteristics associated with the first plurality of users, and wherein the suggested task is determined by the trained machine-learning model further based upon geographic location characteristics associated with the first user or the second plurality of users.

3. The machine-learning based system of claim 1, wherein the instructions to train the machine-learning model include instructions to train the model to suggest tasks further based upon team size characteristics associated with the first plurality of users, and wherein the suggested task is determined by the trained machine-learning model further based upon team size characteristics associated with the first user or the second plurality of users.

4. The machine-learning based system of claim 1, wherein the instructions to train the machine-learning model include instructions to train the model to suggest tasks further based upon team member characteristics associated with the first plurality of users, and wherein the suggested task is determined by the trained machine-learning model further based upon team member characteristics associated with the first user or the second plurality of users.

5. The machine-learning based system of claim 1, wherein the instructions to train the machine-learning model include instructions to train the model to suggest tasks further based upon time efficiency or resource efficiency associated with the first plurality of users, and wherein the suggested task is determined by the trained machine-learning model further based upon time efficiency or resource efficiency associated with the first user or the second plurality of users.

6. The machine-learning based system of claim 1, wherein the instructions to generate the suggested task include instructions to determine a suggested user to be assigned the suggested task, the suggested user being selected from among the second plurality of users.

7. The machine-learning based system of claim 6, wherein the instructions to determine the suggested user include instructions to determine the suggested user based upon skill profiles of one or more of the second plurality of users.

8. The machine-learning based system of claim 6, wherein the instructions to determine the suggested user include instructions to determine the suggested user based upon workload capacities of one or more of the second plurality of users.

9. A machine-learning based method for presenting a suggested task to a first user via a graphical user interface (GUI), the method comprising:
    training a machine-learning model to suggest tasks based on (1) first activity data defining a first set of tasks of a first plurality of users other than the first user, and (2) trigger data that triggered generation of one or more tasks from among the first set of tasks of the first plurality of users,
    receiving, via a computer network, from a dashboard application, second activity data defining a second set of tasks of a second plurality of users other than the first user, the second plurality of users being associated with the first user,
    generating a suggested task for assignment by the first user to at least one user among the second plurality of users, wherein the suggested task is determined by the trained machine-learning model based on the second activity data, and
    providing, to the dashboard application at a client device of the first user, the suggested task to cause the dashboard application to display a drag-and-drop interface to enable the first user to assign the suggested task to a selected user from among the second plurality of users via one or more drag-and-drop interactions with the GUI.

10. The machine-learning based method of claim 9, wherein training the machine-learning model includes training the machine-learning model based upon geographic location characteristics associated with the first plurality of users, and wherein generating the suggested task includes generating the suggested task further based upon geographic location characteristics associated with the first user or the second plurality of users.

11. The machine-learning based method of claim 9, wherein training the machine-learning model includes training the machine-learning model based upon team size characteristics associated with the first plurality of users, and wherein generating the suggested task includes generating the suggested task further based upon team size characteristics associated with the first user or the second plurality of users.

12. The machine-learning based method of claim 9, wherein training the machine-learning model includes training the machine-learning model based upon team member characteristics associated with the first plurality of users, and wherein generating the suggested task includes generating the suggested task further based upon team member characteristics associated with the first user or the second plurality of users.

13. The machine-learning based method of claim 9, wherein training the machine-learning model includes training the machine-learning model based upon time efficiency or resource efficiency associated with the first plurality of users, and wherein generating the suggested task includes generating the suggested task further based upon time efficiency or resource efficiency associated with the first user or the second plurality of users.

14. The machine-learning based method of claim 9, wherein generating the suggested task includes determining a suggested user to be assigned the suggested task, the suggested user being selected from among the second plurality of users.

15. The machine-learning based method of claim 14, wherein determining the suggested user is based upon skill profiles of one or more of the second plurality of users.

16. The machine-learning based method of claim 14, wherein determining the suggested user is based upon workload capacities of one or more of the second plurality of users.

17. One or more non-transitory computer readable media storing instructions that, when executed by one or more processors of a computing device, causes the computing device to:
 train a machine-learning model to suggest tasks based on (1) first activity data defining a first set of tasks of a first plurality of users other than the first user, and (2) trigger data that triggered generation of one or more tasks from among the first set of tasks of the first plurality of users,
 receive, via a computer network, from a dashboard application, second activity data defining a second set of tasks of a second plurality of users other than the first user, the second plurality of users being associated with the first user,
 generate a suggested task for assignment by the first user to at least one user among the second plurality of users, wherein the suggested task is determined by the trained machine-learning model based on the second activity data, and
 provide, to the dashboard application at a client device of the first user, the suggested task to cause the dashboard application to display a drag-and-drop interface to enable the first user to assign the suggested task to a selected user from among the second plurality of users via one or more drag-and-drop interactions with a graphical user interface.

18. The one or more non-transitory computer readable media of claim 17, wherein the instructions to train the machine-learning model include instructions to train the model to suggest tasks further based upon geographic location characteristics associated with the first plurality of users, and wherein the suggested task is determined by the trained machine-learning model further based upon geographic location characteristics associated with the first user or the second plurality of users.

19. The one or more non-transitory computer readable media of claim 17, wherein the instructions to train the machine-learning model include instructions to train the model to suggest tasks further based upon time efficiency or resource efficiency associated with the first plurality of users, and wherein the suggested task is determined by the trained machine-learning model further based upon time efficiency or resource efficiency associated with the first user or the second plurality of users.

20. The one or more non-transitory computer readable media of claim 17, wherein the instructions to generate the suggested task include instructions to determine a suggested user to be assigned the suggested task, the suggested user being selected from among the second plurality of users.

* * * * *